US008607218B2

(12) United States Patent
Motta et al.

(10) Patent No.: US 8,607,218 B2
(45) Date of Patent: Dec. 10, 2013

(54) UPDATING COMPUTER FILES

(75) Inventors: Giovanni Motta, San Diego, CA (US);
Ashish Varma, San Diego, CA (US);
Brian O'Neill, San Juan Capistrano, CA (US); LaShawn McGhee, San Diego, CA (US)

(73) Assignee: Palm, Inc., Sunnyvale, CA (US)

( * ) Notice: Subject to any disclaimer, the term of this patent is extended or adjusted under 35 U.S.C. 154(b) by 195 days.

(21) Appl. No.: 13/260,219

(22) PCT Filed: Feb. 25, 2010

(86) PCT No.: PCT/US2010/025420
§ 371 (c)(1),
(2), (4) Date: Sep. 23, 2011

(87) PCT Pub. No.: WO2011/106007
PCT Pub. Date: Sep. 1, 2011

(65) Prior Publication Data
US 2012/0023489 A1    Jan. 26, 2012

(51) Int. Cl.
*G06F 9/44* (2006.01)

(52) U.S. Cl.
USPC .......................................... 717/168

(58) Field of Classification Search
USPC .......................................... 171/168
See application file for complete search history.

(56) References Cited

U.S. PATENT DOCUMENTS 7,665,081 B1    2/2010  Pavlyushchik
2005/0289534 A1  12/2005 Kim et al.
2006/0080651 A1   4/2006 Gupta et al.
2007/0252906 A1  11/2007 Ulichney et al.
2009/0260000 A1  10/2009 Pilant et al.

FOREIGN PATENT DOCUMENTS

KR    10-2007-0000867 A    1/2007

OTHER PUBLICATIONS

Forman et al.; "Finding Similar Files in Large Document Repositories"; 11th ACM SIGKDD International Conference on Knowledge Discovery and Data Mining (KDD'05); Aug. 21-25, 2005.*
Bigi, Brigitte; "Using Kullback-Leibler Distance for Text Categorization"; European Conference on Information Retrieval Research (ECIR) 2003; Apr. 14-16, 2003.*
"Delta Encoding"; Wikipedia website as captured by the Wayback Machine Internet archive (archive.org) on May 4, 2010.*
Trapani, Gina; "Compare and Merge Files and Folders With WinMerge"; lifehacker.com website; Aug. 17, 2007.*
"Multidimensional Arrays"; Willamette University Computer Science Dept. website as captured by the Wayback Machine Internet archive (archive.org) on Sep. 19, 2010.*
Bhagwat, et al, "Extreme Binning: Scalable, Paralleiizable Deduplication for File Backup", HP Laboratories, HPL-2009-10.

(Continued)

*Primary Examiner* — Wei Zhen
*Assistant Examiner* — Clint Thatcher

(57) ABSTRACT

A method of updating computer software includes identifying an orphaned computer file in a second version of computer software, the orphaned computer file having a name that does not correspond to any name of a computer file in a first version of computer software and computing symmetric divergence between the orphaned computer file and each computer file in the first version of computer software. The method also includes choosing a file from the computer files in the first version of computer software that yields a minimum value of symmetric divergence between the file and the orphaned computer file and using the file as a reference file for compressing the orphaned computer file.

17 Claims, 3 Drawing Sheets

(56) References Cited

OTHER PUBLICATIONS

Broder; "Identifying and Filtering Near-Duplicate Documents", AltaVista Company, San Mateo, CA 94402, USA, 2000.

Broder; "On the resemblance and containment of documents", Digital Systems Research Center, IEEE Computer Society Washington, DC, USA © 1997.

Charikar; "Similarity Estimation Techniques from Rounding Algorithms", Dept. of Computer Science, Princeton University, May 19-21, 2002.

Douglis, et al; "Application-specific Delta-encoding via Resemblance Detection", USENIX Annual Technical Conference, 2003.

Forman, et al; "Finding Similar Files in Large Document Repositories", HP Laboratories Palo Alto, HPL-2005-42(R.1), Jun. 15, 2005.

International Search Report and Written Opinion received in PCT Application No. PCT/US2010/025420, mailed Nov. 16, 2010, pp. 8.

Kumar, et al; "Duplicate and Near Duplicate Documents Detection: A Review", European Journal of Scientific Research ISSN 1450-216X vol. 32 No. 4 (2009), pp. 514-527 © EuroJourna.

Manber; "Finding Similar Files in a Large File System", Department of Computer Science, The University of Arizona, TR 93-33, Oct. 1993.

Narayana, et al; "Effective Detection of Near Duplicate Web Documents in Web Crawling", International Journal of Computational Intelligence Research ISSN 0973-1873 vol. 5, No. 1 (2009), pp. 83-96 © Research India Publications.

Slawski; "New Google Process for Detecting Near Duplicate Content", http://www.seobythesea.com/2008/02/new-google-process-for-detecting-near-duplicate-content/, Feb. 23, 2008.

Xiao, et al; "Efficient Similarity Joins for Near Duplicate Detection", WWW 2008 / Refereed Track: Data Mining—Algorithms Apr. 21-25, 2008.

\* cited by examiner

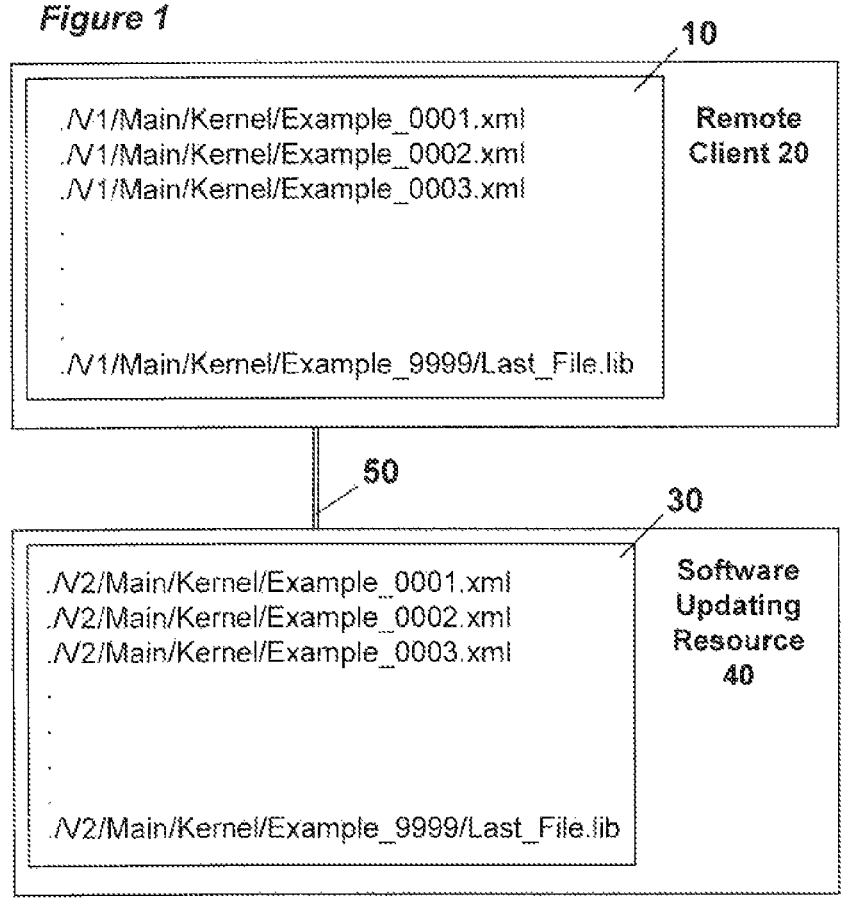
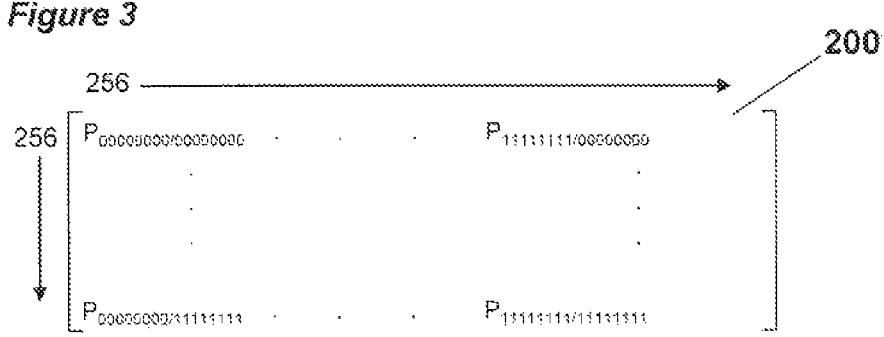

UPDATING COMPUTER FILES

BACKGROUND

In an environment in which a centralized processing resource is tasked with updating remotely-located client devices, it is typically undesirable for the processing resource to transmit large files, such as (for example) an entire operating system, without some level of file compression. Without at least a basic level of compression, the processing resource may spend an inordinate amount of time conveying the update to the client devices. Further, the channel that connects the processing resource with the client devices may be unavailable for other uses during the time that the update is occurring.

In a wide area wireless communications system, such as a cellular telephone system, transmitting a software update from cellular base stations over the air to receiving cellular communications units may require large amounts of electrical energy as well as consuming precious channel bandwidth. And, bandwidth that is consumed for transmitting updates to communications units is bandwidth that cannot be used for revenue-generating and commercial purposes. Further, as each cellular communications unit is taken out of commission so that the update can be received and processed by the unit, the unit is likely to be unavailable for other communications purposes.

BRIEF DESCRIPTION OF THE DRAWINGS

FIG. 1 is a high-level block diagram of a processing environment showing a remote client and a software updating resource according to an embodiment of the invention.

FIG. 3 represents a 256×256 two-dimensional array of symbol-pair probabilities used to calculate the symmetric divergence of two files according to an embodiment of the invention.

DESCRIPTION OF THE EMBODIMENTS

Figure 2:
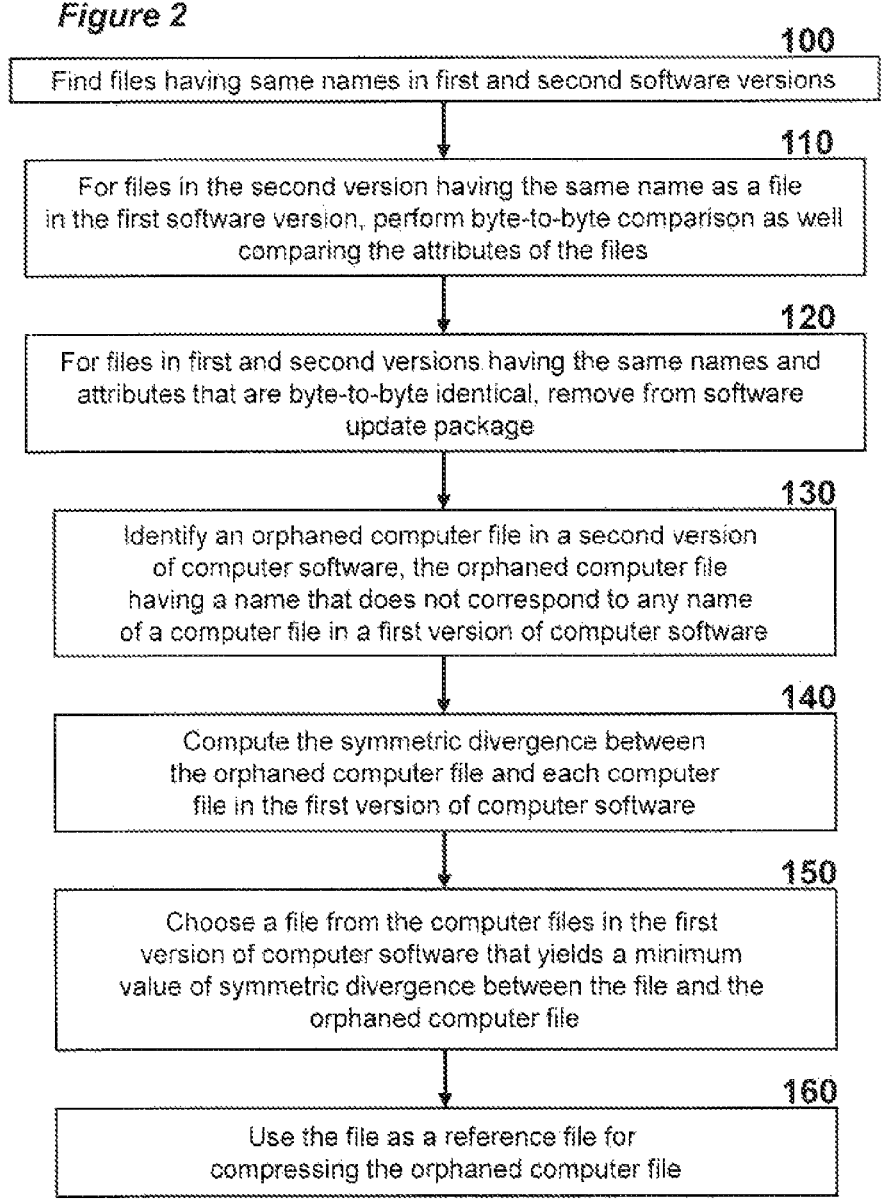
FIG. 2 is a flowchart for a method of updating computer software according to an embodiment of the invention.

A method and system for updating computer files provides a means for saving time and energy when updates to remote clients must be performed in either wired or wireless communications environments. In some embodiments of the invention, computer files of a software update are analyzed and the results of this analysis are compared to the results of similar analyses of computer files of a software version previously loaded on the remote clients. If these results indicate that computer files in the software update share characteristics common to those of computer files previously loaded on the remote client, the updated computer files can be compressed using the previously-loaded computer files as a reference by way of a technique known as differential compression. This can result in an update of a large software package (perhaps greater than 100 MB) using perhaps 10 MB, 5 MB, or even less.

In some embodiments of the invention, statistical techniques are employed to determine the probability of occurrence of symbol pairs, symbol triplets, or even higher order symbol combinations present in a computer file of a software update package. The symbol occurrence probabilities are compared with similar probabilities that pertain to files present in a software version already in use by the remote client. If the two probability sets diverge by less than a predetermined amount, it is likely that the computer file of the software update package can be transmitted as a compressed version that is referenced to a file already loaded on the remote client.

In embodiments of the invention, the term "computer" is intended to encompass a broad range of electronic devices. These devices include, but are not limited to, cellular communications devices that transmit and receive voice and data, portable laptop and handheld computing devices, GPS receivers, as well as fixed-station wireless devices such as wireless hubs, routers, cellular base stations, and so forth. The "computer" may also be a wired or a wireless computer peripheral, such as a printer, copier, facsimile machine, and so forth.

Embodiments of the invention also make use of the term "software", which includes any program that directs the operation of a computer. Software may reside in volatile or non-volatile memory and may consist of higher-level commands that are compiled or interpreted by a general purpose processor. Software may also consist of lower level commands that are more closely tied to particular processing elements such as a controller or other devices.

FIG. 1 is a high-level block diagram of a processing environment showing a remote client (20) and a software updating resource (40) according to an embodiment of the invention. In FIG. 1, first version of computer software 10 represents a number of files stored and organized on remote client 20. First version of computer software 10 may represent an entire software package including an operating system, libraries, configuration files, etc., that controls all of the operations of remote client 20 or may represent only a portion of the software package loaded on the remote client, such as libraries or configuration files. The inventors contemplate that remote client 20 is representative of a group of devices that may number in the hundreds, thousands, millions, or an even more. Thus, in one example, remote client 20 represents one of a large number of cellular communications devices provisioned by a publicly-available cellular carrier. Further, first version of computer software 10 may represent one of dozens, hundreds, or even thousands of computer files.

Software updating resource 40 is contemplated as being a centralized resource, such as a computer server or a group of servers, that provisions remote client 20 with various services. These services may include basic analog and/or digital voice communications, data communications, mobile Internet access, and so forth. In the embodiment of FIG. 1, these communication services, as well as computer software updates to remote client 20, are conducted through the use of communications channel 50. Communications channel 50 may represent a wireless (over the air) communications link, wired communications link (such as a local area network, wide area network, Internet, and so forth), or may be of a hybrid nature in which one or more portions of the channel are wireless while one or more other portions of the channel make use of a wired medium.

Within software updating resource 40, second version of computer software 30 is represented. In the embodiment of FIG. 1, second version of computer software 30 represents a file system intended to replace at least a portion of first version of computer software 10. A conventional method for updating computer software might be to apply one or more compression schemes to second version of computer software 30 and transmit the entire compressed version of the software along communications channel 50. However, the inventors have determined that as feature sets of remote clients increase in capability, the remote devices include larger and larger software file systems. Accordingly, updates to these remote devices become proportionately larger.

FIG. 2 is a flowchart for a method of updating computer software according to an embodiment of the invention. The apparatus of FIG. 4 (described herein) may be used to perform the method of FIG. 2, although nothing prevents the method from being performed using alternative structures. The method of FIG. 2 begins at step 100, which includes finding files of the same name in the first and second versions of computer software. Files having the same name and being perhaps located in the same directory or subdirectory between the first and second software versions are considered to be similar. Thus, as an example, in the event that a file in a first and a second version of computer software are both entitled "Mobile Internet Browser V9.1", it is likely that the two files are similar enough so as to not require additional analysis of the files' similarity.

In one embodiment of the invention, an even higher likelihood that the two files named "Mobile Internet Browser V9.1" are similar between first and second software versions is implied when the two files are located in identical directories (for example "/root/kernel/") in both versions. In another embodiment of the invention, a high probability that the two files are identical could be expected when the two files are at least located in the same subdirectory. In software version 1, for example, the file may be located in the directory "./V1/root/kernel/" while in software version 2 the file might be located in the directory "./V2/root/kernel/".

The method of FIG. 2 continues at step 110 in which the attributes of the files having the same names in the first and second software versions are compared. In the event that the two files possess identical attributes (for example, identical ownership, identical read/write permissions, whether the two files are hidden, and so forth), as well as being identical when compared in a byte-to-byte manner, an update to the file is not necessary. Thus, any computer software update transmitted from an updating, resource to a remote client would not need to include a compressed (or uncompressed) version of this file. Accordingly, these files are removed from the software update package at step 120.

At step 130, one or more "orphaned" computer files in the second version of computer software are identified. In this embodiment, the term "orphaned" indicates a computer file in a second version of computer software that does not have an identical name as a file in the first version of computer software. Thus, in the event that the file "Mobile Internet Browser 9.1" exists in a first version, while the file "Internet Mobile Browser 9.1" exists in a second version, the latter file is said to be "orphaned". On the contrary, if the file "Mobile Internet Browser V9.2" exists in a first version, while the file "Mobile Internet Browser V9.2" exists in a second version, the file is not an orphaned file since both names are identical.

At step 140 a "symmetric divergence" between the orphaned computer file (from the second version of computer software) and each computer file in the first version of computer software is calculated. In the embodiment of FIG. 2, symmetric divergence is a measure of the difference in the occurrence of symbol-pairs between an orphaned computer file and each of the computer files in the first version of computer software that is resident on a remote client. For this embodiment, the symmetric divergence is defined as the maximum quantity of:

$$(D_{KL}(P\|Q), D_{KL}(Q\|P))$$

Wherein $D_{KL}(P\|Q)$ is a measure of the Kullback-Leibler divergence in the probability of occurrence of symbol pairs.

As those of skill in the art aware of, the Kullback-Leibler divergence is a non-symmetric measure of relative entropy between two probability distributions P and Q. The quantity $D_{KL}(P\|Q)$ can be expressed as:

$$D_{KL}(P\|Q) = -\Sigma_x P(x) \log Q(x) + \Sigma_x P(x) \log P(x)$$

As it pertains to at least some embodiments of the present invention, the expression $D_{KL}(P\|Q)$ can be interpreted as the number of extra information binary digits (bits) necessary to code samples from an information source having a probability distribution P with a code based on probability distribution Q. However, given the non-symmetrical nature of $D_{KL}(P\|Q)$, meaning that $D_{KL}(P\|Q) \neq D_{KL}(Q\|P)$, the inventors have determined that using the maximum quantity of $(D_{KL}(P\|Q), D_{KL}(Q\|P))$ provides repeatable results when actual computer software files are analyzed.

In one embodiment of the invention, rather than use the Kullback-Leibler symmetric divergence of single symbol probabilities, the symmetric divergence of higher order symbol probabilities is used. Shown in FIG. 3 is a 256×256 two-dimensional array of symbol-pair probabilities used to calculate the symmetric divergence of two files according to an embodiment of the invention. In this example, two-dimensional array 200 is constructed and the probability of occurrence of consecutive pairs of 8-bit words from each orphaned computer file of the second version of computer software and from each file of the first version of the computer software are calculated. Thus, for both files, the top left entry of each array might correspond to the probability of 00000000 being followed by 00000000 ($P_{00000000/00000000}$). At the bottom right of each 256×256 array, the probability of 11111111 being followed by 11111111 ($P_{11111111/11111111}$) is entered. At other locations in the 256×256 array, the probabilities of the remaining symbol combinations are entered.

In other embodiments of the invention, higher order symbol-occurrence probabilities beyond symbol pairs may be used. Thus, in one example, a three-dimensional array can be constructed in which the probability of occurrence of 8-bit triplets are entered. Still other embodiments of the invention may use a four dimensional array in which the probability of occurrence of four consecutive symbols sequences are entered. However, although 3, 4, and higher-dimensioned arrays are possible, the inventors have determined that excellent results can be achieved using the 256×256 two-dimensional array such as is represented in FIG. 3. This is to say that increases in the complexity of the probability-of-occurrence arrays for each 8-bit symbol (beyond two dimensions) does not provide a significant increase in the accuracy of a Kullback-Leibler-based method.

After computing the symmetric divergence of the symbol pairs between one or more orphaned computer files in the second version of computer software and each computer file in the first version of computer software, as in step 140, the method proceeds to step 150. At step 150, the computer file from the first version of computer software and the orphaned file from the second version of computer software that exhibit a minimum of symmetric divergence is chosen. If the calculated symmetric divergence is lower than a predetermined amount, these file pairs are selected for further processing. In one embodiment of the invention that has provided excellent results according to the inventors, the predetermined amount set for symmetric divergence is set to 0.1. However, in other embodiments of the invention, the maximum amount for symmetric divergence may be set to a smaller number (such as 0.05 or less) or may be set to a larger number (such as 0.15 or greater).

The method proceeds to step 160 in which the file from the first version of computer software determined in step 150 is used as a reference for differentially compressing the orphaned computer file from the second version of computer software. In many instances, this enables a large computer file from a computer software update package to be compressed and transmitted as perhaps a very small file in which compression is referenced to a file in the first version of computer software already present on the remote device.

The inventors have determined that calculating the Kullback-Leibler symmetric divergence between symbol pairs of orphaned files and files from a previous software version can be as effective in determining similarity between files as performing a large number of byte-to-byte comparisons between files of each version. Thus, for file systems containing many thousands of computer files in both first and second software versions, there is no need to compare each file of the first version with each file of the second version, which could require perhaps millions of file comparisons. By way of selecting only orphaned files from the second computer software version, the number of comparisons between files of the second version of computer software and the first version of computer software can be reduced by more than tenfold.

It should be noted that the inventors have experienced instances in which a low value (such as less than 0.05) of Kullback-Leibler symmetric divergence between an orphaned file and a file from a previous software version have not resulted in a substantial reduction in the update file size when differential compression was applied. In these instances, the calculation of the symmetric divergence in symbol-pair occurrences yields a number that erroneously indicates that the orphaned file can be conveyed to the remote unit as a small deviation from a reference file already loaded on the remote unit. Under these "false alarm" circumstances, the orphaned file can still be compressed according to conventional techniques without referencing a particular file from a software version already loaded on the remote unit.

An additional example of a false alarm occurs when files being analyzed are smaller than a predetermined minimum size. In these instances, perhaps only very few symbol pairs occurring in files from the first and second versions computer software versions are present, thus resulting in most entries of the exemplary 256×256 array being 0. The resulting Kullback-Leibler symmetric divergence could thus be expected to be quite low, even though the files may have few symbol pairs in common with each other. This represents another instance in which conventional compression techniques that do not involve differential compression should be applied to the computer update file. For this reason, it may be useful for some embodiments of the invention to apply the method of FIG. 2 only on nonempty files of a second version of computer software.

In most instances, the method of FIG. 2 performs one file comparison between the files of version 1 and version 2. Thus, when files having the same (or a substantially similar) name in the first and second software versions are detected in step 100, compared in a byte-to-byte manner in step 110, and then removed from the software update package in step 120, further reference to the particular file name is not made throughout the remainder of the method. As an example, in the event that both the first and second versions include the file "library__1234.xml", any additional occurrence of this file in the second version does not bring about a second comparison of file names in version 1 to determine a second match. Consequently, an additional occurrence of this file (library__1234.xml) in version 2 might result in the file being labeled as an orphan.

However, in using a method similar to that of FIG. 2, the inventors have encountered instances in which a large file in a first computer software version has been divided into two or more files in a second software version with each of the two or more files in the second software version being significantly smaller than the large file encountered in the first version. For example, a file entitled "library__1234.xml", having a size of 5 MB in a first version might be divided into two files having the names "library__1234.xml" and "library__1234.dat" in the second version, with each file of the second version having a size of 2.5 MB. In this instance, it might be expected that not only is there a small symmetric divergence between the symbol probability pairs of the two files entitled "library__1234.xml", there may also be low symmetric divergence in the symbol probability pairs between the files "library__1234.xml" and "library__1234.dat". Thus, in one example, it may be beneficial to compress "library__1234.dat" by referencing "library__123.xml" as an instance in which a similarly-named file of a second version is significantly smaller than a corresponding file name of a first software version.

Figure 4:
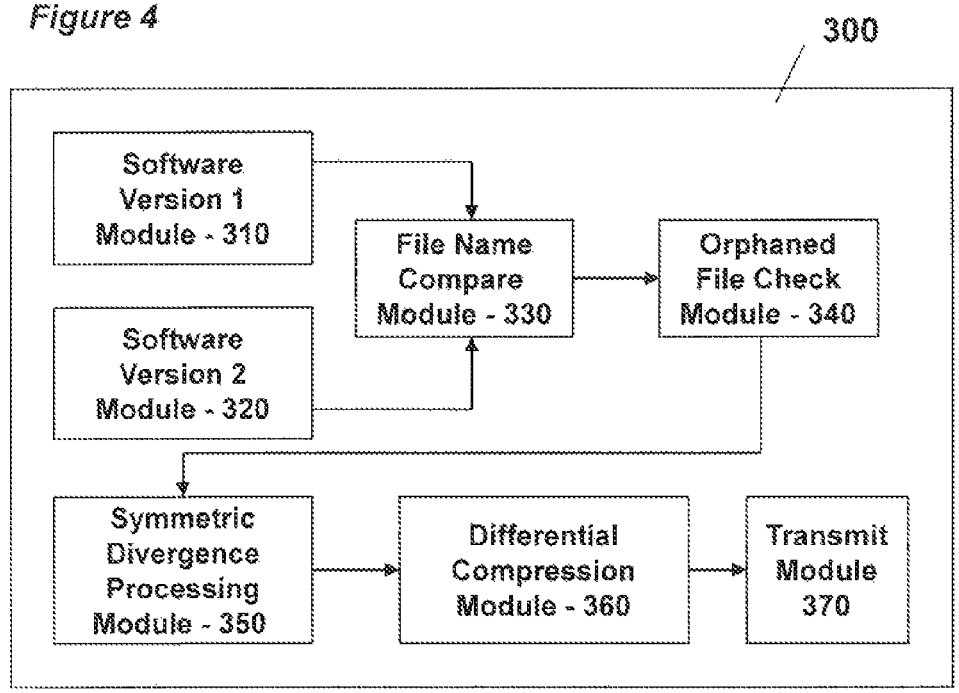
FIG. 4 represents a logic module for updating computer software according to an embodiment of the invention.

FIG. 4 represents a logic module 300 for updating computer software according to an embodiment of the invention. The logic module of FIG. 4 may be embodied in software for use on a computer system such as a server, or may be embodied on smaller computing platforms such as personal computers, laptop computers, or handheld computing devices. Additionally, one or more of the logic modules of FIG. 4 may be implemented in hardware, or perhaps as part of a system that includes both hardware and software elements.

In FIG. 4, software version 1 module 310 represents an image of the software previously loaded onto one or more remote clients, such as remote client 20 of FIG. 1. Software version 2 module 320 represents a software configuration intended to be loaded onto the one or more remote clients. File name compare module 330 represents a logic block in which files from software version 2 module 320 are compared with files from software version 1 module 310. In some embodiments of the invention, the directory or subdirectory, within which each file is located, are also compared. If orphaned files are detected (in which an orphaned file is a computer file of software version 2 that does not have a name identical to that of a file in software version 1), the orphaned files are conveyed to orphaned file check module 340. In module 340, checking routines may be performed in which files from either version that do not meet predetermined size criteria are removed from further analysis.

The output of orphaned file check module 340 is conveyed to symmetric divergence processing module 350. In this module, the symmetric divergence between an orphaned file from software version 2 and one or more files from software version 1 is determined. When the symmetric divergence between the files is found to be less than a predetermined amount (such as 0.1) the two candidate files may be conveyed to differential compression module 360. In this module, compression algorithms are applied to the orphaned file from software version 2 using the file from software version 1 as a reference. The output of differential compression module 360 is then conveyed to one or more remote units by way of transmit module 370.

In conclusion, while the present invention has been particularly shown and described with reference to various embodiments, those skilled in the art will understand that many variations may be made therein without departing from the spirit and scope of the invention as defined in the following claims. This description of the invention should be understood to include the novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring nor excluding two or more such elements.

What is claimed is:

1. A method of updating computer software, comprising: identifying an orphaned computer file in a second version of computer software, the orphaned computer file having a name that does not correspond to any name of a computer file in a first version of computer software; computing symmetric divergence between the orphaned computer file and each computer file in the first version of computer software; choosing a file from the computer files in the first version of computer software that yields a minimum value of symmetric divergence between the file and the orphaned computer file; using the file as a reference file for compressing the orphaned computer file; and compressing the orphaned file without referencing a particular file from the first version of computer software when the files being analyzed are smaller than a predetermined minimum size, resulting in a low symmetric divergence even though the files have few symbol pairs in common with each other.

2. The method of claim 1, in which the orphaned computer file additionally has an extension that does not correspond to any extension of a computer file in the first version of computer software.

3. The method of claim 1, wherein the step of computing symmetric divergence is performed only on nonempty computer files in the second version of computer software.

4. The method of claim 1, wherein the step of computing symmetric divergence is performed only on orphaned computer files and computer files in the first version of computer software of a predetermined minimum size.

5. The method of claim 1, wherein symmetric divergence is a measure of the difference in the occurrence of symbol pairs between the orphaned computer file and each of the computer files in the first version of computer software.

6. The method of claim 5, wherein symmetric divergence is calculated using Kullback-Leibler divergence in the probability of occurrence of symbol pairs between the orphaned computer file and each of the computer files in the first version of computer software.

7. The method of claim 6, wherein the minimum value of symmetric divergence between the file and the orphaned computer file is less than 0.1.

8. The method of claim 1, wherein symmetric divergence is a measure of the difference in the occurrence of symbol triplets between the orphaned computer file and each of the computer files in the first version of computer software.

9. A logic module for updating computer software, the logic module including computer-readable program code stored on a non-transient computer-readable medium and executable by a processor, the logic module comprising: a file name compare module for determining files present in a second version of computer software not present in a first version of computer software; an orphaned file check module for identifying an orphaned computer file in the second version of computer software, the orphaned computer file having a name that does not correspond to any name of a computer file in the first version of computer software; a file divergence processing module for determining the symmetric divergence between the orphaned computer file and a file from the first version of computer software, wherein the orphaned file is compressed without referencing a particular file from the first version of computer software when the files being analyzed are smaller than a predetermined minimum size, resulting in a low symmetric divergence even though the files have few symbol pairs in common with each other; and a differential compression module for compressing the orphaned computer file using the file from the first version of computer software as a reference.

10. The logic module of claim 9, wherein the symmetric divergence processing module constructs a two-dimensional array of the probability of symbol-pair occurrences between files in the first and second versions of computer software.

11. The logic module of claim 9, wherein the symmetric divergence processing module constructs one of the group consisting of a three-dimensional array wherein each entry of the three dimensional array indicates a probability of symbol triplets occurrences.

12. The logic module of claim 9, additionally comprising a file check module for removing, from further analysis, files from one of the group consisting of the first version of computer software and the second version of computer software that do not meet predetermined size criteria.

13. The logic module of claim 9, wherein the file divergence processing module outputs a measure of symmetric divergence.

14. The logic module of claim 13, wherein the measure of symmetric divergence pertains to the Kullback-Leibler symmetric divergence.

15. The logic module of claim 14, wherein the differential compression module operates on the file from the second version of computer software when the Kullback-Leibler symmetric divergence between the file from the second version of computer software and the file from the first version of computer software are less than 0.1.

16. The method of claim 1, further comprising: finding files having same names in the first version of computer software and the second version of computer software; for files in the second version of computer software having a same filename as a file in the first version of computer software, performing byte-to-byte comparison and comparing attributes of the files; removing the files in the first version of computer software and the second version of computer software that have the same name and attributes that are byte-to-byte identical from a software update package.

17. The method of claim 16, wherein the attributes of the files include ownership, read/write permissions, and whether the files are hidden.

* * * * *